(12) United States Patent
Shibata

(10) Patent No.: US 8,169,174 B2
(45) Date of Patent: May 1, 2012

(54) MOTOR CIRCUIT AND ELECTRIC POWER STEERING APPARATUS

(75) Inventor: Yoshiyuki Shibata, Toyota (JP)

(73) Assignee: JTEKT Corporation, Osaka (JP)

( * ) Notice: Subject to any disclaimer, the term of this patent is extended or adjusted under 35 U.S.C. 154(b) by 365 days.

(21) Appl. No.: 12/585,661

(22) Filed: Sep. 21, 2009

(65) Prior Publication Data

US 2010/0079095 A1   Apr. 1, 2010

(30) Foreign Application Priority Data

Sep. 26, 2008   (JP) ................. 2008-247137

(51) Int. Cl.
*H02K 17/32*   (2006.01)
(52) U.S. Cl. .............. 318/434; 701/41; 701/43; 701/29; 701/30; 701/35; 318/31; 318/34; 318/799; 318/496; 318/494; 180/411; 180/443; 180/446; 180/407; 180/402; 361/23; 361/24; 361/25; 361/30; 361/33; 388/903
(58) Field of Classification Search .................. 318/799, 318/771–777, 31, 494, 496, 34, 439, 138, 318/524, 15, 433, 434, 86, 757, 785, 786, 318/375, 362; 322/16, 38, 39; 310/179; 180/411, 443, 446, 402, 407; 361/23, 24, 361/25, 30, 31, 33; 388/903; 701/41–43, 701/29, 30, 33
See application file for complete search history.

(56) References Cited

U.S. PATENT DOCUMENTS

| | | | |
|---|---|---|---|
| 6,469,461 B1 | 10/2002 | Konda et al. | |
| 6,759,823 B2 * | 7/2004 | Witzig | 318/434 |
| 2004/0228050 A1 * | 11/2004 | Recker et al. | 361/23 |
| 2004/0257018 A1 * | 12/2004 | Tobias et al. | 318/439 |
| 2005/0159866 A1 * | 7/2005 | Takeuchi et al. | 701/41 |
| 2009/0032327 A1 * | 2/2009 | Yasuda | 180/443 |

FOREIGN PATENT DOCUMENTS

| | | | |
|---|---|---|---|
| DE | 10049385 A1 | | 5/2001 |
| DE | 10019736 A1 * | | 10/2001 |
| DE | 10100159 A1 | | 10/2001 |
| JP | 2006021645 A * | | 1/2006 |
| JP | A-2007-166792 | | 6/2007 |
| JP | 2007306720 A * | | 11/2007 |
| JP | A 2007-306720 | | 11/2007 |
| JP | 2008049780 A * | | 3/2008 |
| WO | WO 02094636 A1 * | | 11/2002 |

OTHER PUBLICATIONS

European Search Report dated Aug. 18, 2011 issued in European Patent Application No. 09170960.0.
Shibata et al.; U.S. Appl. No. 12/427,983; Apr. 22, 2009.

* cited by examiner

*Primary Examiner* — Walter Benson
*Assistant Examiner* — Jorge Carrasquillo
(74) *Attorney, Agent, or Firm* — Oliff & Berridge, PLC

(57) ABSTRACT

In a steering control unit, a U-phase feed line branches into paired branch feed lines, phase-open MOSFETs are provided in middle portions of the branch feed lines, phase-open MOSFETs are provided in middle portions of a V-phase feed line and a W-phase feed line, and the phase-open MOSFETs are arranged in such a manner that parasitic diodes are in the same orientation with respect to a motor. When an abnormality occurs, all the phase-open MOSFETs are turned off. Then, a closed circuit, which includes phase coils and through which electric currents flow, is no longer present.

8 Claims, 7 Drawing Sheets

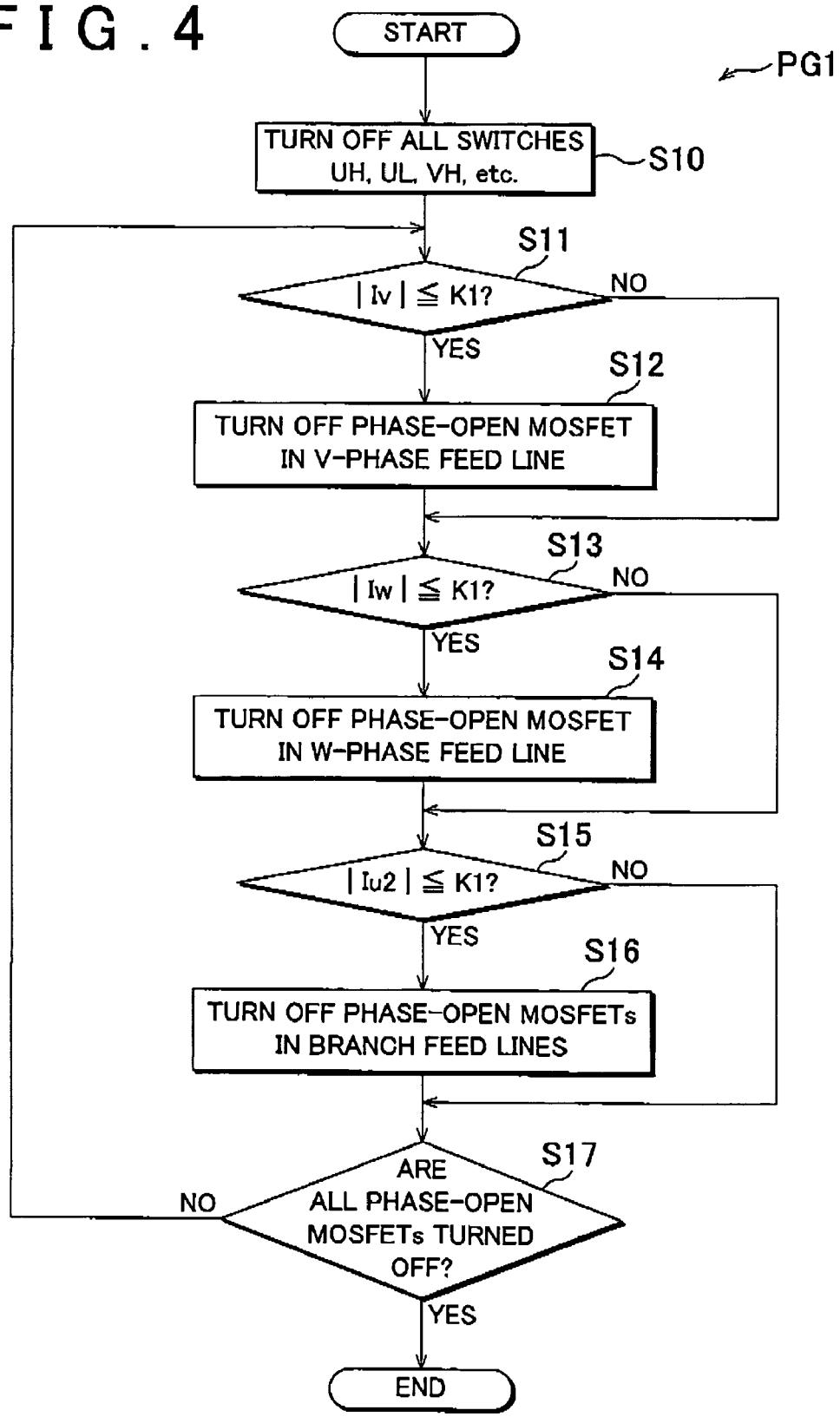

MOTOR CIRCUIT AND ELECTRIC POWER STEERING APPARATUS

INCORPORATION BY REFERENCE

The disclosure of Japanese Patent Application No. 2008-247137 filed on Sep. 26, 2008 including the specification, drawings and abstract is incorporated herein by reference in its entirety.

BACKGROUND OF THE INVENTION

1. Field of the Invention

The invention relates to an electric power steering apparatus.

2. Description of the Related Art

In an electric power steering apparatus, if an alternating-current motor for steering assist cannot be driven due to an abnormality, the alternating-current motor is rotated in accordance with a steering operation performed on a steering wheel. In this case, the alternating-current motor serves as an electric power generator, and, for example, a battery of a vehicle is charged with the electric power generated by the alternating-current motor. In this case, the steering resistance includes, in addition to the friction resistance at a movable portion, the resistance for generating electric power by converting kinetic energy to electric energy (hereinafter, referred to as "power generation resistance"). In order to reduce the steering resistance, an electric power steering apparatus, in which multiple feed lines that connect a motor drive control circuit to an alternating-current motor are provided with switches, has been developed. In this electric power steering apparatus, if an abnormality occurs, the switches are turned off to disconnect the motor drive control circuit and the alternating-current motor from each other. Thus, the power generation resistance is excluded from the steering resistance. As a result, it is possible to reduce the steering resistance at the time of occurrence of an abnormality (refer to, for example, Japanese Patent Application Publication No. 2007-306720 (JP-A-2007-306720).

In the above-described electric power steering apparatus, the connection among phase coils of the alternating-current motor is the so-called star-connection (Y-connection). Therefore, if all the switches provided in the feed lines are turned off, a closed circuit, which includes the phase coils of the alternating-current motor and through which electric currents flow, is no longer present. As a result, it is possible to reduce the steering resistance. However, when the connection among the phase coils of the alternating-current motor is the ring-connection (delta-connection), even if all the switches provided in the feed lines are turned off, the phase coils, connected to each other in the ring-connection manner, still form a closed circuit and circulation currents flow through the closed circuit. Therefore, it is not possible to sufficiently reduce the steering resistance at the time of occurrence of an abnormality.

SUMMARY OF THE INVENTION

It is an object of the invention to provide an electric power steering apparatus that includes a motor circuit with which the above-described problem is solved.

An aspect of the invention relates to a motor circuit that includes: an alternating-current motor that includes first phase to $n_{th}$ phase coils; a motor drive control circuit that includes first phase to $n_{th}$ phase alternating-current feed lines through which an n-phase alternating-current is supplied to the alternating-current motor; and phase-open MOSFETs that disconnect the motor drive control circuit and the alternating-current motor from each other in an abnormal condition where the three-phase alternating-current is not able to be output. The first phase alternating-current feed line branches into paired branch feed lines. The first phase to $n_{th}$ phase coils are connected to each other in the ring-connection manner by arranging the first phase to $n_{th}$ phase coils, connected to each other in series, between paired branch feed lines, and connecting the second phase to $n_{th}$ phase alternating-current feed lines to portions at which the phase coils are connected to each other in a serial connection circuit that includes the first phase to $n_{th}$ phase coils. The phase-open MOSFETs are provided in the paired branch feed lines and the second phase to $n_{th}$ phase alternating-current feed lines. Parasitic diodes of all the phase-open MOSFETs are in the same orientation with respect to the alternating-current motor.

In the motor circuit described above, the first phase to $n_{th}$ phase coils are connected to each other in the ring-connection manner by arranging the first phase to $n_{th}$ phase coils, connected to each other in series, between paired branch feed lines that branch off from the first phase alternating-current feed line, and connecting the second phase and $n_{th}$ phase alternating-current feed lines to portions at which the phase coils are connected to each other.

In addition, the phase-open MOSFETs are provided in the paired branch feed lines and the second phase to $n_{th}$ phase alternating-current feed lines, and the parasitic diodes of all the phase-open MOSFETs are in the same orientation with respect to the alternating-current motor. Therefore, when all the phase-open MOSFETs are turned off, a closed circuit, which includes the phase coils and through which an electric current may flow, is no longer present. Therefore, it is possible to reliably disconnect the motor drive circuit and the alternating-current motor from each other to eliminate the power generation resistance that may be generated when electric power is generated by the alternating-current motor, and to prevent the circulation currents from flowing through the first to $n_{th}$ phase coils that are connected to each other in the ring-connection manner.

Another aspect of the invention relates to a motor circuit that includes: an alternating-current motor that includes first phase to $n_{th}$ phase coils; a motor drive control circuit that includes first phase to $n_{th}$ phase alternating-current feed lines through which an n-phase alternating-current is supplied to the alternating-current motor; and phase-open mechanical switches that disconnect the motor drive control circuit and the alternating-current motor from each other in an abnormal condition where the n-phase alternating-current is not able to be output. The first phase alternating-current feed line branches into paired branch feed lines. The first phase to $n_{th}$ phase coils are connected to each other in the ring-connection manner by arranging the first phase to $n_{th}$ phase coils, connected to each other in series, between paired branch feed lines, and connecting the second phase to $n_{th}$ phase alternating-current feed lines to portions at which the phase coils are connected to each other in a serial connection circuit that includes the first phase to $n_{th}$ phase coils. The phase-open mechanical switches are provided in the second phase to $n_{th}$ phase alternating-current feed lines and one of the paired branch feed lines.

In the motor circuit described above, the first phase to $n_{th}$ phase coils are connected to each other in the ring-connection manner by arranging the first phase to $n_{th}$ phase coils, connected to each other in series, between paired branch feed lines, and connecting the second phase and $n_{th}$ phase alternating-current feed lines to portions at which the phase coils are connected to each other.

In addition, the phase-open mechanical switches are provided in the second phase to $n_{th}$ phase alternating-current feed lines and one of the branch feed lines. Therefore, when all the phase-open mechanical switches are turned off, a closed circuit, which includes the phase coils and through which an electric current may flow, is no longer present. Therefore, it is possible to reliably disconnect the motor drive circuit and the alternating-current motor from each other to eliminate the power generation resistance that may be generated when electric power is generated by the alternating-current motor, and to prevent the circulation currents from flowing through the first to $n_{th}$ phase coils that are connected to each other in the ring-connection manner.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4 is a flowchart showing a power feeding emergency stop program;

DETAILED DESCRIPTION OF THE EMBODIMENTS

Figure 1:
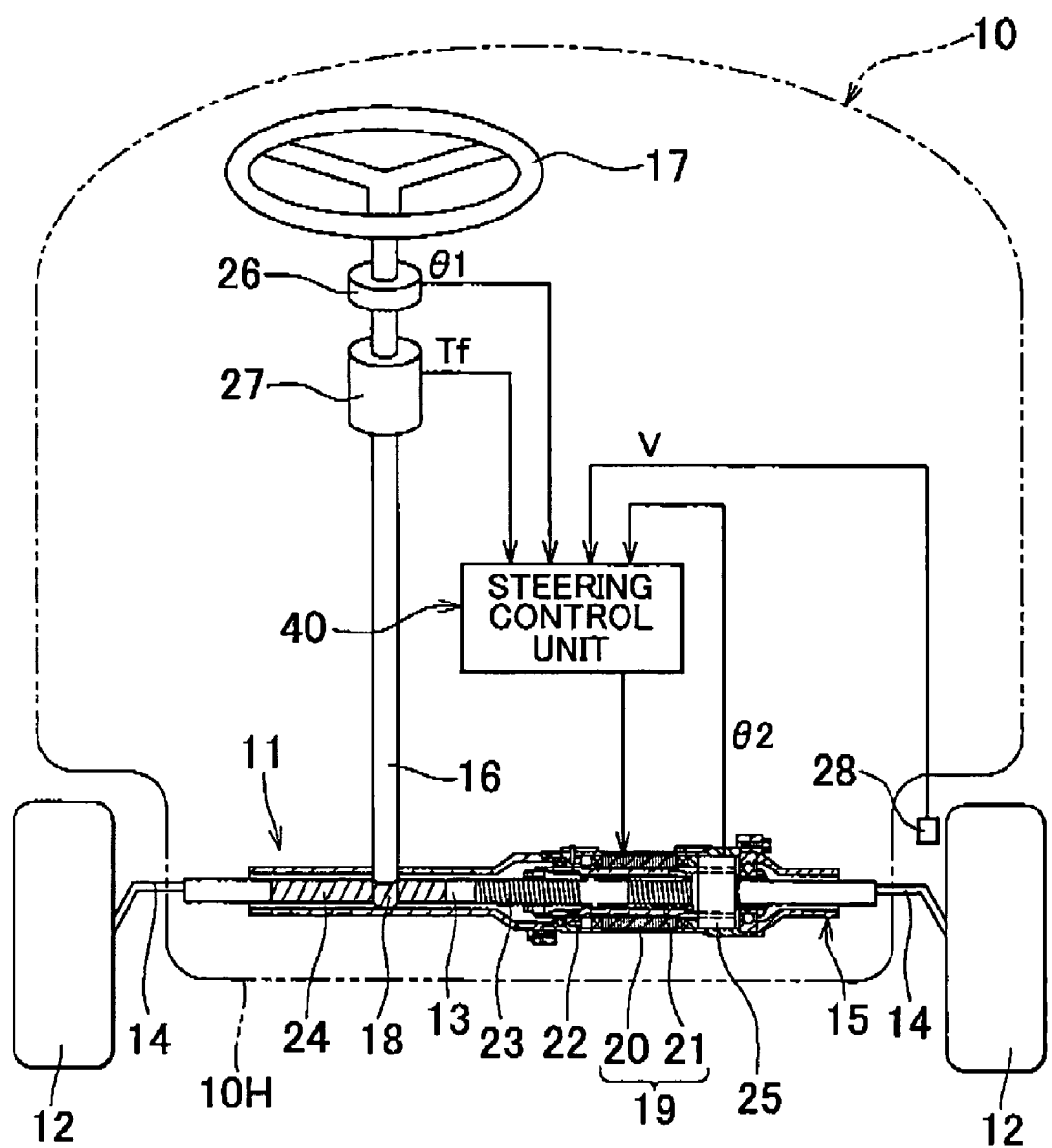
FIG. 1 is a schematic diagram showing a vehicle that includes a steering control unit according to a first embodiment.

Hereinafter, a first embodiment of the invention will be described with reference to FIG. 1 to FIG. 5. FIG. 1 shows a vehicle 10 that includes an electric power steering apparatus 11. The electric power steering apparatus 11 includes an inter-steered wheel shaft 13 that extends in the lateral direction of the vehicle 10, and the inter-steered wheel shaft 13 passes through a cylindrical housing 15 that is fixed to a vehicle body 10H. The respective ends of the inter-steered wheel shaft 13 are connected to steered wheels 12 via tie-rods 14.

The electric power steering apparatus 11 includes a three-phase alternating-current motor 19 (hereinafter, referred to as "motor 19") that serves as a drive source. A stator 20 of the motor 19 is fixed in the cylindrical housing 15, and the inter-steered wheel shaft 13 passes through a hollow portion of a rotor 21 of the motor 19. A ball nut 22 that is fixed to the inner face of the rotor 21 is screwed to a ball screw portion 23 that is formed in the outer face of the inter-steered wheel shaft 13. Rotation of the rotor 21 causes linear motion of the ball screw portion 23. The motor 19 is provided with a rotational position sensor 25 that detects the rotational position θ2 of the rotor 21.

As shown in FIG. 1, a rack 24 is formed in one end portion of the inter-steered wheel shaft 13, and a pinion 18 formed at the lower end portion of a steering shaft 16 is meshed with the rack 24. A steering wheel 17 is fitted to the upper end portion of the steering shaft 16, and a torque sensor 27 and a steering angle sensor 26 are fitted to a middle portion of the steering shaft 16. Near the steered wheel 12, there is provided a vehicle speed sensor 28 that detects the vehicle speed V based on the rotational speed of the steered wheel 12.

Figure 2:
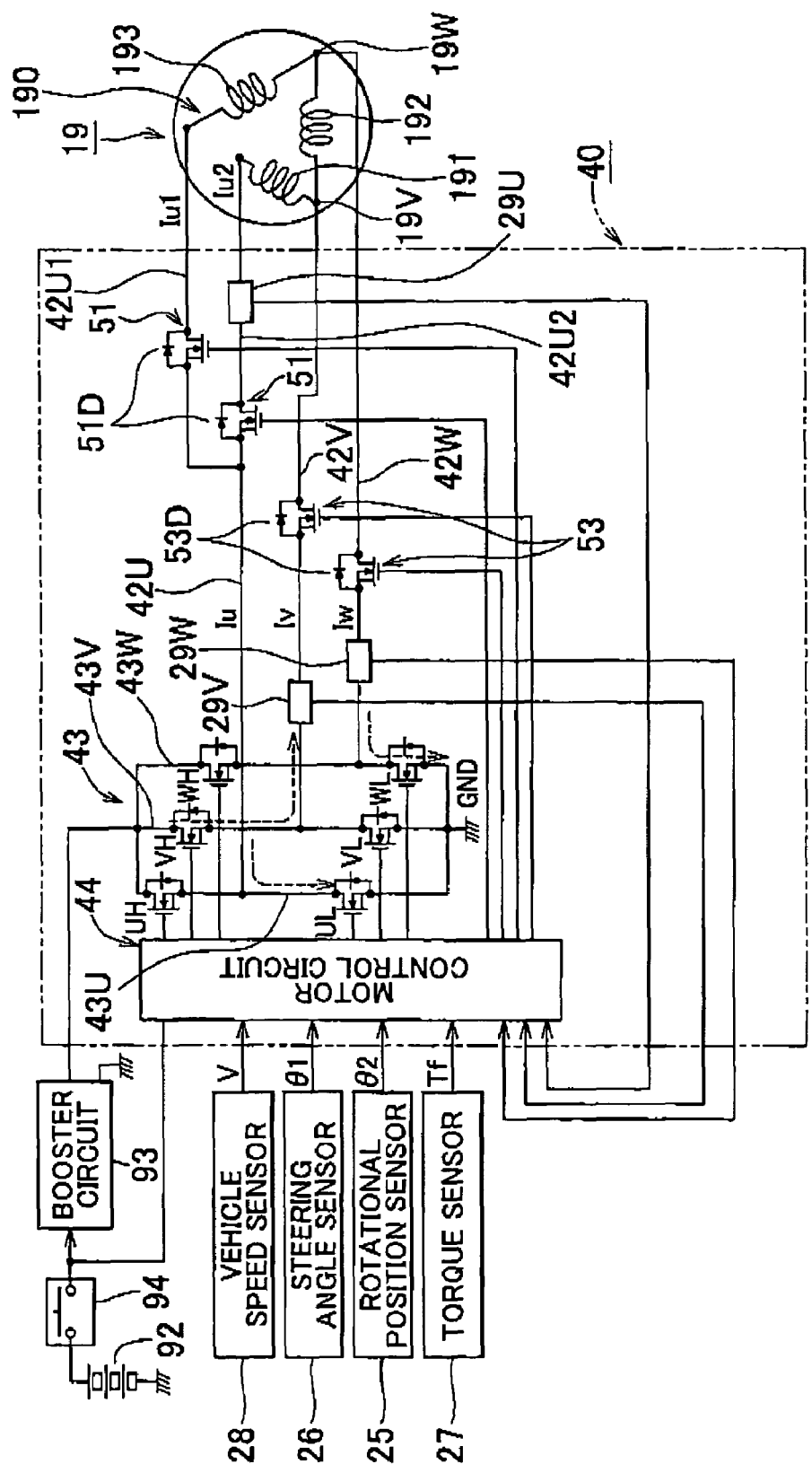
FIG. 2 is a circuit diagram showing the steering control unit.

A steering control unit (more specifically, an ECU) 40 that controls the motor 19 is mounted in the vehicle 10. As shown in FIG. 2, the steering control unit 40 includes a motor drive circuit 43 and a motor control circuit 44. When an ignition switch 94 is turned on, the steering control unit 40 is brought into electrical continuity with a battery 92 and activated. The motor 19 and the steering control unit 40 are connected to each other by a connector (not shown). The steering control unit 40 may function as a "motor drive control circuit" according to the invention, and the steering control unit 40 and the motor 19 may constitute a "motor circuit" according to the invention.

The motor control circuit 44 includes a CPU (not shown) and a memory (not shown), and executes a program stored in the memory to execute an on-off control over a group of switches UH, UL, VH, etc. described below.

The motor drive circuit 43 is a three-bridge circuit that includes a U-phase circuit 43U, a V-phase circuit 43V, and a W-phase circuit 43W that are formed between the positive electrode and the negative electrode (GND) of a booster circuit 93 connected to the battery 92. The U-phase circuit 43U includes an upper-side switch UH and a lower-side switch UL that are connected to each other in series, and a feed line 42U extends from a line that connects the upper-side switch UH and the lower-side switch UL to each other. The U-phase feed line 42U branches into paired branch feed lines 42U1 and 42U2, and a first phase coil 191, a second phase coil 192 and a third phase coil 193 of the motor 19 are arranged between the paired branch feed lines 42U1 and 42U2 and connected to each other in series. That is, the so-called delta connection is established among the first phase coil 191, the second phase coil 192 and the third phase coil 193. The U-phase feed line 42U may function as a "first phase alternating-current feed line" according to the invention. Hereafter, when the branch feed lines 42U1 and 42U2 need to be distinguished from each other, the branch feed line 42U1 will be referred to as a "first branch feed line 42U1", and the branch feed line 42U2 will be referred to as a "second branch feed line 42U2".

The V-phase circuit 43V includes an upper-side switch VH and a lower-side switch VL, and a feed line 42V extends from a line that connects the upper-side switch VH and the lower-side switch VL to each other. The V-phase feed line 42V is connected to a connection portion 19V, at which the first phase coil 191 and the second phase coil 192 are connected to each other, within a serial connection circuit 190 that includes the first phase coil 191, the second phase coil 192 and the third phase coil 193.

The W-phase circuit 43W includes an upper-side switch WH and a lower-side switch WL, and a feed line 42W extends from a line that connects the upper-side switch WH and the lower-side switch WL to each other. The W-phase feed line 42W is connected to a connection portion 19W, at which the second phase coil 192 and the third phase coil 193 are connected to each other, within the serial connection circuit 190 that includes the first phase coil 191, the second phase coil 192 and the third phase coil 193. The V-phase feed line 42V and the W-phase feed line 42W may function as a "second phase alternating-current feed line" and a "third phase alternating-current feed line" according to the invention, respectively.

The switches UH, UL, VH, etc. of the motor drive circuit 43 are formed of, for example, N-channel MOSFETs (Metal Oxide Semiconductor Field Effect Transistors), and the gates of the MOSFETs are connected to the motor control circuit 44. Current sensors 29U, 29V and 29W (for example, hall elements) are provided in middle portions of the second branch feed line 42U2, the V-phase feed line 42V and the W-phase feed line 42W, respectively.

The motor control circuit 44 periodically executes a steering control program (not shown) stored in the memory (not shown), and determines the motor current command value (q-axis current command value) based on the detection results (V, θ1, θ2, Tf) obtained by the vehicle speed sensor 28, the steering angle sensor 26, the rotational position sensor 25, and the torque sensor 27. The motor control circuit 44 determines the U-phase current Iu, the V-phase current Iv, and the W-phase current Iw based on the motor current command value, according to the detection result obtained by the rotational position sensor 25. The motor control circuit 44 executes the on-off control over the group of switches UH, UL and VH of the motor drive circuit 43 in such a manner that the U-phase current Iu, the V-phase current Iv, and the W-phase current Iw are supplied to the feed lines 42U, 42V and 42W of the motor drive circuit 43, respectively.

Figure 3A:
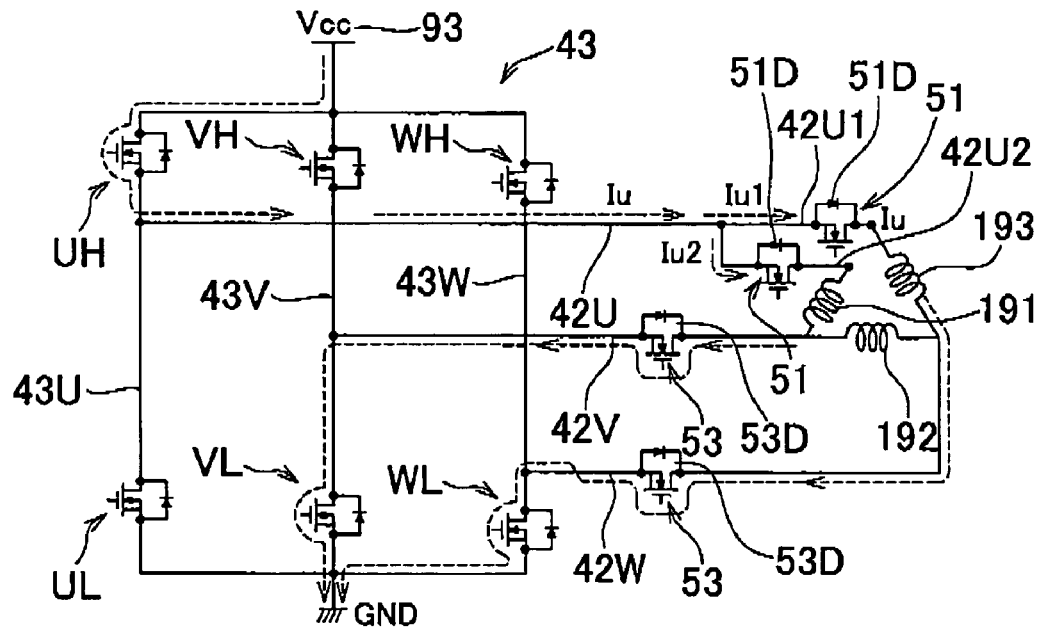
FIG. 3A is a circuit diagram showing a manner in which a motor drive circuit and a motor are connected to each other.
Figure 3B:
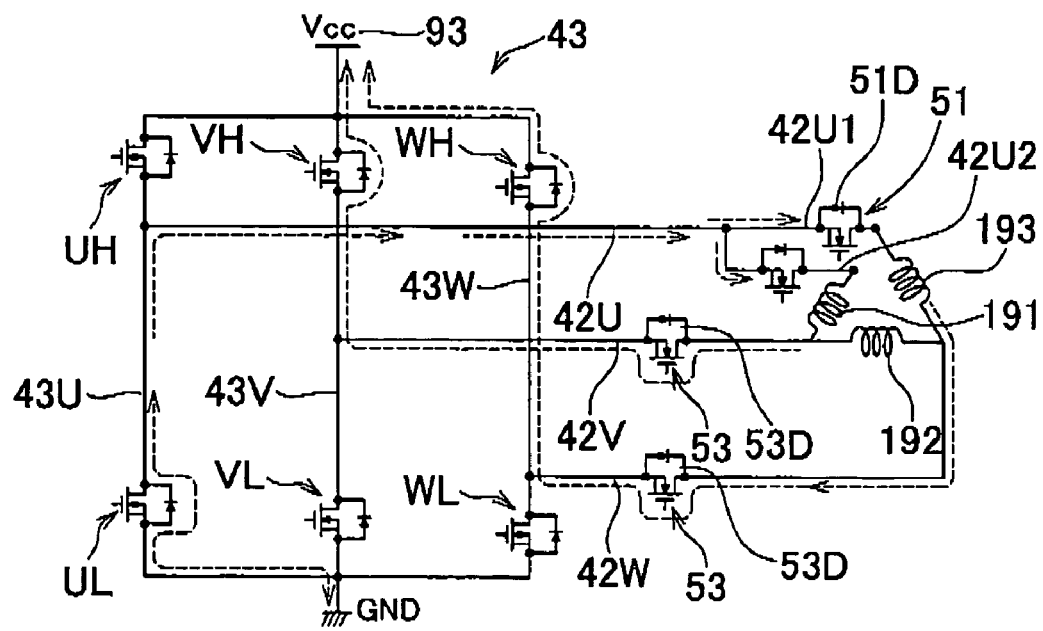
FIG. 3B is a circuit diagram showing a manner in which the motor drive circuit and the motor are connected to each other.

More specifically, the group of switches UH, UL, VH, etc, of the motor drive circuit 43 is placed in one of the condition where one of the upper-side switches UH, VH and WH is on and two of the lower-side switches UL, VL and WL are on, or the condition where two of the upper-side switches UH, VH and WH are on and one of the lower-side switches UL, VL, and WL is on. For example, arrowed dashed lines in the motor drive circuit 43 in FIG. 3A show the flows of electric currents when only the U-phase switch UH is on among the upper-side switches and only the V-phase switch VL and the W-phase switch WL are on among the lower-side switches in the motor drive circuit 43. In this case, the current Iu that flows through the U-phase feed line 42U is distributed between the branch feed lines 42U1 and 42U2, and the currents Iu1 and Iu2 that flow through the branch feed lines 42U1 and 42U2 flow into the third phase coil 193 and the first phase coil 191 of the motor 19 and then flow to the lower-side switch WL and the lower-side switch VL through the W-phase feed line 42W and the V-phase feed line 42V, respectively.

The V-phase current Iv and the W-phase current Iw that flow through the feed line 42V and the feed line 42W are detected by the current sensor 29V and the current sensor 29W, respectively, and the current Iu that flows through the U-phase feed line 42U is calculated based on the detection results obtained by the current sensors 29V and 29W. Based on the detection results, the U-phase current Iu, the V-phase current Iv and the W-phase current Iw are controlled in a feedback manner by the motor control circuit 44.

The motor control circuit 44 turns off all the switches UH, UL, VH, etc. of the motor drive circuit 43 when, for example, an abnormality occurs in at least one of the switches UH, UL, VH, etc. and various sensors 25 to 28. At this time, the electric power stored in the inductance (the first phase coil 191, the second phase coil 192, and the third phase coil 193) of the motor 19 is liberated, and regenerative currents flow through the motor drive circuit 43 and the motor 19. More specifically, when all the switches UH, UL and VH are turned off after the U-phase current Iu, the V-phase current Iv and the W-phase current Iw indicated by the arrowed dashed lines in FIG. 3A flow, regenerative currents shown by arrowed dashed lines in FIG. 3B flow. The regenerative current flows from the lower-side portion of the U-phase circuit 43U to the feed line 42U through a parasitic diode of the U-phase lower-side switch UL, and distributed between the first phase coil 191 and the third phase coil 193 of the motor 19. Then, the regenerative currents from the motor 19 flow through the feed lines 42V and 42W, and flow into the booster circuit 93 through a parasitic diode of the upper-side switch VH of the feed line 42V and a parasitic diode of the upper-side switch WH of the feed line 42W.

If the steering wheel 17 is operated when the group of switches UH, UL, VH, etc. is off, circulation currents may flow through the first phase coil 191, the second phase coil 192 and the third phase coil 193 that are connected to each other in the delta-connection manner by the paired branch feed lines 42U1 and 42U2. The circulation currents may flow through the coils 191, 192 and 193, for example, because the difference in the coil resistance among the coils 191, 192 and 193 is large, magnetization of a rotor magnet is imbalanced, the rotor 21 and the stator 20 are not sufficiently coaxial with each other, the circularity of the inner peripheral face of the stator 20 is not sufficient, or the coil resistance or the magnetic characteristic is changed because the temperature of the motor 19 becomes non-uniform.

In contrast, according to the first embodiment, phase-open MOSFETs 51 are provided in middle portions of the paired branch feed lines 42U1 and 42U2, and phase-open MOSFETs 53 are provided in middle portions of the V-phase feed line 42V and the W-phase feed line 42W so that the above-described regenerative currents and circulation currents are prevented from flowing through the coils 191, 192 and 193 when an abnormality occurs.

Each of the phase-open MOSFETs 51 and 53 is, for example, an N-channel MOSFET, and parasitic diodes 51D of the phase-open MOSFETs 51 and parasitic diodes 53D of the phase-open MOSFETs 53 are all in the same orientation with respect to the motor 19. More specifically, as shown in FIG. 2, the drains of the phase-open MOSFETs 51 and 53 are connected to the feed lines at portions proximal to the motor 19, and the sources of the phase-open MOSFETs 51 and 53 are connected to the feed lines at portions proximal to the motor drive circuit 43 so that only the electric currents that flow into the motor 19 are supplied to the parasitic diodes 51D and 53D. The gates of the phase-open MOSFETs 51 and 53 are connected to the motor control circuit 44.

When the ignition switch 94 is on, the four phase-open MOSFETs, that is, the MOSFETs 51 and the MOSFETs 53, are supplied with gate voltage from the motor control circuit 44 and kept on. Thus, electric currents flow between the feed lines 42U, 42V and 42W, and the motor 19. When the ignition switch 94 is turned off, all the phase-open MOSFETs 51 and 53 are also turned off. In contrast, when an abnormality occurs in at least one of the various sensors 25 to 28 and the switch elements UH, UL, VH, etc. of the motor drive circuit 43, even if the ignition switch 94 is on, supply of the gate voltage from the motor control circuit 44 to the phase-open MOSFETs 51 and 53 is stopped at predetermined timing, and all the phase-open MOSFETSs 51 and 53 are turned off.

More specifically, when an abnormality occurs, the motor control circuit 44 executes the power feeding emergency stop program PG1 shown in FIG. 4 as an interrupt processing program. The configuration of the power feeding emergency stop program will be described below together with the effects of the first embodiment.

The effects of the first embodiment will be described below. In the steering control unit 40 according to the first embodiment, while the vehicle 10 is in motion, a three-phase alternating-current formed of the U-phase current Iu, the V-phase current Iv and the W-phase current Iw generated in the motor drive circuit 43 is supplied to the motor 19. Thus, the motor 19 is driven to assist a driver in performing a steering operation. If an abnormality occurs, the steering control unit 40 executes the power feeding emergency stop program PG1 shown in FIG. 4 as an interrupt-processing program. When the power feeding emergency stop program PG1 is executed, all the switches UH, UL, VH, etc. of the U-phase circuit 43U, the V-phase circuit 43V and the W-phase circuit 43W in the motor drive circuit 43 are turned off (S10).

However, even after the motor drive circuit 43 is stopped, for example, the above-described regenerative currents or circulation currents may flow through the feed lines 42U (branch feed lines 42U1 and 42U2), 42V and 42W. Therefore, if the phase-open MOSFETs 51 provided in the branch feed lines 42U1 and 42U2 and the phase-open MOSFETs 53 provided in the feed lines 42V and 42W are turned off at the same time that electric power supply from the motor drive circuit 43 is stopped, spike voltage may be generated and the phase-open MOSFETs 51 and 53 may break.

Therefore, in the power feeding emergency stop program PG1, after all the switches UH, UL, VH, etc. are turned off (S10), whether electric currents are flowing through the branch feed lines 42U1 and 42U2 provided with the phase-open MOSFETs 51 and the feed lines 42V and 42W provided with the phase-open MOSFETs 53 is determined based on the detection results obtained by the current sensors 29U, 29V and 29W. More specifically, for example, it is determined whether the effective value of the current Iv that flows through the V-phase feed line 42V is equal to or lower than the predetermined reference value K1, that is, substantially equal to "0" (S11). If it is determined that the absolute value of the V-phase current Iv is equal to or lower than the predetermined reference value K1 ("YES" in S11), the phase-open MOSFET 53 provided in the V-phase feed line 42V is turned off (S12).

If it is determined that the absolute value of the V-phase current Iv is higher than the reference value K1 ("NO" in S11), the phase-open MOSFET 53 provided in the feed line 42V is not turned off, and it is determined whether the absolute value of the current Iw that flows through the W-phase feed line 42W is equal to or lower than the predetermined reference value K1, that is, substantially equal to "0" (S13). If it is determined that the absolute value of the W-phase current Iw is equal to or lower than the predetermined reference value K1 ("YES" in S13), the phase-open MOSFET 53 provided in the W-phase feed line 42W is turned off (S14).

If it is determined that the absolute value of the W-phase current Iw is higher than the reference value K1 ("NO" in S13), the phase-open MOSFET 53 provided in the feed line 42w is not turned off, and it is determined whether the absolute value of the current Iu2 that flows through the second branch feed line 42U2 is equal to or lower than the predetermined reference value K1, that is, substantially equal to "0" (S15). If it is determined that the absolute value of the current Iu2 that flows through the second branch feed line 42U2 is equal to or lower than the predetermined reference value K1 ("YES" in S15), the phase-open MOSFETs 51 provided in the paired branch feed lines 42U1 and 42U2 are turned off (S16). If it is determined that the absolute value of the current Iu2 that flows through the second branch feed line 42U2 is higher than the reference value K1 ("NO" in S15), the phase-open MOSFETs 51 are not turned off.

Then, it is determined whether all the phase-open MOSFETs 51 and 53 are turned off (S17). If at least one of the phase-open MOSFETs 51 and 53 is on ("NO" in S17), step S11 and the following steps are executed again. On the other hand, if all the phase-open MOSFETs 51 and 53 are turned off ("YES" in S17), the power feeding emergency stop program PG1 ends.

When an electric current flows between the source and the drain of at least one of the phase-open MOSFETs 51 and 53, if the motor control circuit 44 executes the power feeding emergency stop program PG1 shown in FIG. 4, the phase-open MOSFET, in which the electric current flows between the source and the drain, is turned off after the electric current flowing between the source and the drain becomes equal to or lower than the predetermined reference value K1 (substantially equal to 0). Thus, the spike voltage that may be generated when the open-phase MOSFETs 51 and 53 are turned off is suppressed. Therefore, it is no longer necessary to use expensive MOSFETs that withstand the spike voltage, as the open-phase MOSFETs 51 and 53. As a result, it is possible to reduce the cost.

When the power feeding emergency stop program PG1 ends, the V-phase feed line 42V and the W-phase feed line 42W are disconnected from the paired branch feed lines 42U1 and 42U2, and a closed circuit that includes the phase coils 191, 192 and 193 of the motor 19 is no longer present. That is, it is possible to reliably disconnect the motor drive circuit 43 and the motor 19 from each other to eliminate the power generation resistance that may be generated when electric power is generated by the motor 19, and to prevent the circulation currents from flowing through the first phase coil 191, the second phase coil 192, and the third phase coil 193 that are connected to each other in the delta-connection manner.

Figure 5A:
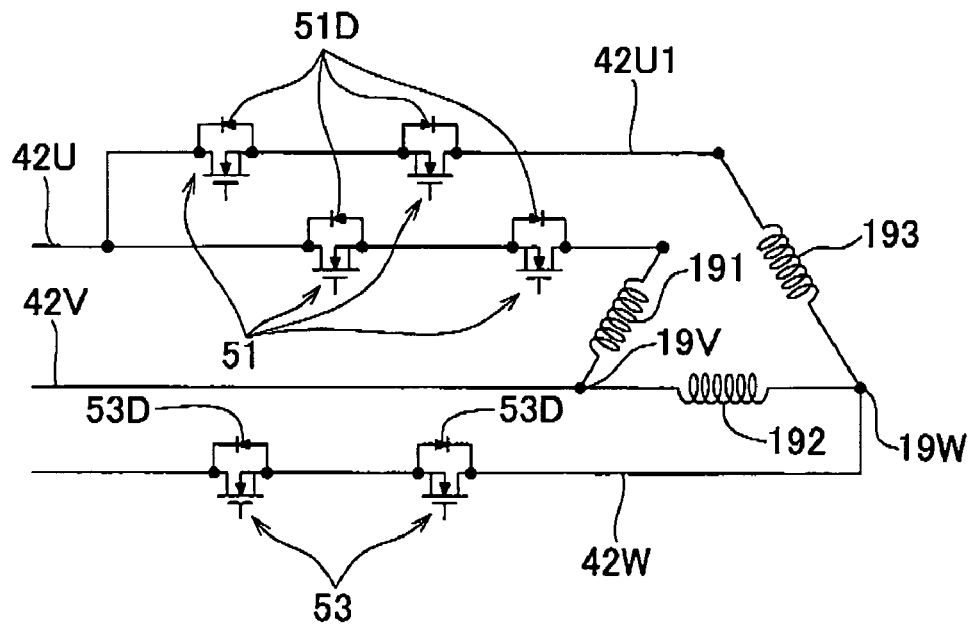
FIG. 5A is a circuit diagram showing an example of arrangement of phase-open MOSFETs.

FIG. 5A shows an example of the configuration in which the motor drive circuit 43 and the motor 19 are disconnected from each other by turning off the phase-open MOSFETs to prevent circulation currents from flowing through the phase coils 191, 192 and 193. In the configuration shown in FIG. 5A, the V-phase feed line 42V is not provided with the phase-open MOSFET, the branch feed line 42U1 is provided with paired phase-open MOSFETs 51 that are arranged in such a manner that the parasitic diodes 51D are in opposite orientations, the branch feed line 42U2 is provided with paired phase-open MOSFETs 51 that are arranged in such a manner that the parasitic diodes 51D are in opposite orientations, and the W-phase feed line 42W is provided with paired phase-open MOSFETs 53 that are arranged in such a manner that the parasitic diodes 53D are in opposite orientations. In this case, however, it is necessary to prepare six phase-open MOSFETs in total.

Figure 5B:
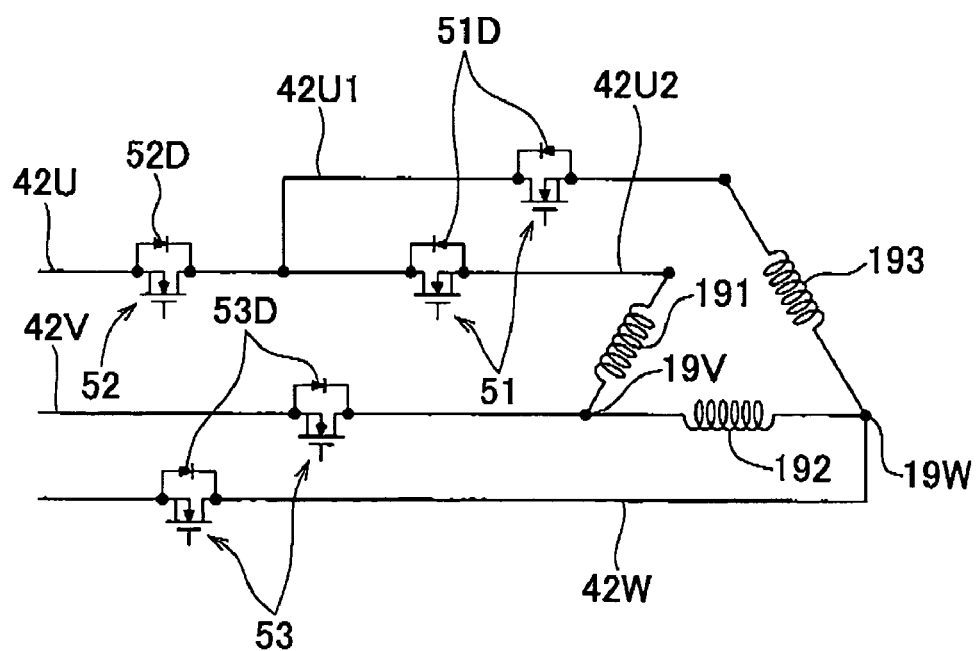
FIG. 5B is a circuit diagram showing an example of arrangement of the phase-open MOSFETs.

FIG. 5B shows another configuration. In the configuration shown in FIG. 5B, the paired branch feed lines 42U1 and 42U2 are provided with the phase-open MOSFETs 51, the V-phase feed line 42V and the W-phase feed line 42W are provided with the phase-open MOSFETs 53, the parasitic diodes 51D of the MOSFETs 51 and the parasitic diodes 53D of the MOSFETS 53 are in opposite orientations with respect to the motor 19, and a phase-open MOSFET 52 that includes a parasitic diode 52D that is in the orientation opposite of the orientation of the parasitic diodes 51D is provided in the U-phase feed line 42U at a position closer to the motor drive circuit 43 than the position at which the feed line 42U branches into the paired branch feed lines 42U1 and 42U2. In this case, however, it is necessary to prepare five phase-open MOSFETs in total.

In contrast, according to the first embodiment, the number of the phase-open MOSFETs is four. That is, the number of the phase-open MOSFETs in the first embodiment is smaller than the number of the phase-open MOSFETs in each of the configurations shown in FIGS. 5A and 5B. Therefore, it is possible to suppress the cost of the phase-open MOSFETs. Also, the space for the phase-open MOSFETs is reduced.

The effects of the first embodiment will be briefly described below. According to the first embodiment, it is possible to reliably disconnect the motor 19 and the motor drive circuit 43 from each other to eliminate the power generation resistance that may be generated when electric power is generated by the motor 19, and to prevent the circulation currents from flowing through the phase coils 191, 192 and 193 that are connected to each other in the delta-connection manner. Thus, it is possible to reliably reduce the resistance to an operation of the steering wheel 17 at the time of occurrence of an abnormality. Each of the phase-open MOSFETs 51 and 53 is a semiconductor element. Therefore, unlike a mechanical switch, the situation where a switch does not operate because foreign matter is caught in the switch does not occur. Therefore, when an abnormality occurs, it is possible to reliably disconnect the motor drive circuit 43 and the motor 19 from each other, and to disconnect the first phase coil 191 and the third phase coil 193 from each other among the first phase 191, the second phase coil 192 and the third phase coil 193 that are connected to each other in the delta-connection manner. Also, if an electric current flows through at least one of the phase-open MOSFETs 51 and 53 when an abnormality occurs, the phase-open MOSFET in which the electric current flows is turned off after the electric current that flows through this phase-open MOSFET becomes equal to or lower than the predetermined reference value K1. As a result, spike voltage is not generated. Therefore, it is no longer necessary to use expensive MOSFETs that withstand the spike voltage, as the open-phase MOSFETs 51 and 53. As a result, it is possible to reduce the cost.

Figure 6:
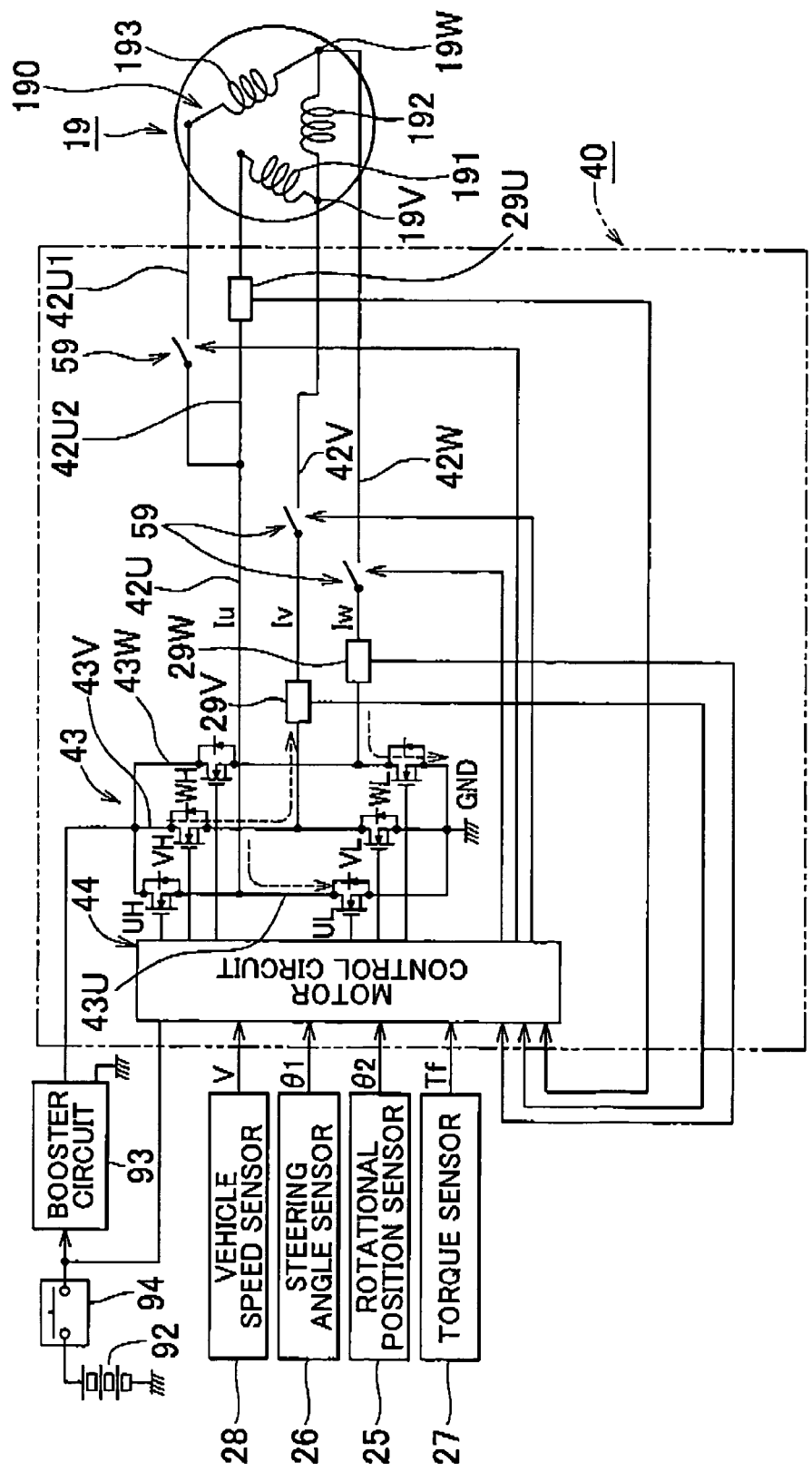
FIG. 6 is a circuit diagram showing a steering control unit according to a second embodiment.

The configuration according to a second embodiment of the invention is shown in FIG. 6. In this configuration, each of the two feed lines 42V and 42W and the first branch feed line 42U1 in the motor drive circuit 43 is provided with one phase-open mechanical switch 59. When the ignition switch 94 is on, the mechanical switches 59 are supplied with the voltage from the motor control circuit 44 and kept on. Thus, it is possible to supply electric currents to the feed lines 42V and 42W and the first branch feed line 42U1 as well as to the second branch feed line 52U2 that is not provided with the mechanical switch 59. Also, when the ignition switch 94 is turned off, the mechanical switches 59 are turned off, and flows of electric currents are shut off in both directions.

When an abnormality occurs, even if the ignition switch 94 is on, the voltage from the motor control circuit 44 is no longer supplied to the mechanical switches 59, and all the mechanical switches 59 are turned off.

If all the mechanical switches 59 are turned off, a closed circuit that includes the phase coils 191, 192 and 193 of the motor 19 is no longer present. That is, it is possible to reliably disconnect the motor drive circuit 43 and the motor 19 from each other to eliminate the power generation resistance that may be generated when electric power is generated by the motor 19, and to prevent circulation currents from flowing through the first phase coil 191, the second phase coil 192, and the third phase coil 193 of the motor 19. As a result, it is possible to reduce the resistance to an operation of the steering wheel 17 at the time of occurrence of an abnormality.

The other configurations in the second embodiment are the same as those in the first embodiment. Therefore, the same portions are denoted by the same reference numerals and the description concerning the same portions will not be provided below. According to the second embodiment, the same effects as those in the first embodiment are obtained.

The invention is not limited to the embodiments described above. For example, embodiments described below fall within the technical scope of the invention. In addition, the invention may cover various other modifications within the scope of the invention.

1) In the first and second embodiments, the invention is applied to the so-called rack electric power steering apparatus in which the cylindrical motor 19 and the inter-steered wheel shaft 13 are connected to each other by the ball screw mechanism. Alternatively, the invention may be applied to a pinion electric power steering apparatus in which a motor is connected to an inter-steered wheel shaft by a rack-and-pinion mechanism. Further alternatively, the invention may be applied to a column electric power steering apparatus in which a motor is connected to a middle portion of a steering shaft with a gear.

2) In the first embodiment, each of the phase-open MOSFETs 51 and 53 is an N-channel MOSFET. Alternatively, each of the phase-open MOSFETs 51 and 53 may be a P-channel MOSFET.

3) The current sensors 29U, 29V and 29W in the first and second embodiments are hall elements. Alternatively, the current sensors 29U, 29V and 29W may be shunt resistors or current transformers. The locations of the current sensors 29V and 29W need not be limited to the feed lines 42V and 42W as long as the current sensors 29V and 29W can detect the V-phase current Iv and the W-phase current Iw, respectively. For example, the current sensors 29V and 29W may be provided in GND-side portions of the V-phase circuit 43V and the W-phase circuit 43W. Alternatively, the current sensor 29U may be provided in a middle portion of the first branch feed line 42U1.

4) In the first embodiment, the phase-open MOSFETs 51 and 53 are arranged in such a manner that the parasitic diodes 51D and 53D are supplied with only the electric currents that flow into the motor 19. However, the arrangement of the phase-open MOSFETs 51 and 53 is not particularly limited as long as the parasitic diodes 51D and 53D are in the same orientation with respect to the motor 19. For example, the phase-open MOSFETs 51 and 53 may be arranged in such a manner that the parasitic diodes 51D and 53D are supplied with only the electric currents that flow out of the motor 19.

5) In the first and second embodiments, the paired branch feed lines branch off from the U-phase feed line 42U. Alternatively, paired branch feed lines may branch off from the V-phase feed line 42V or the W-phase feed line 42W.

Figure 7A:
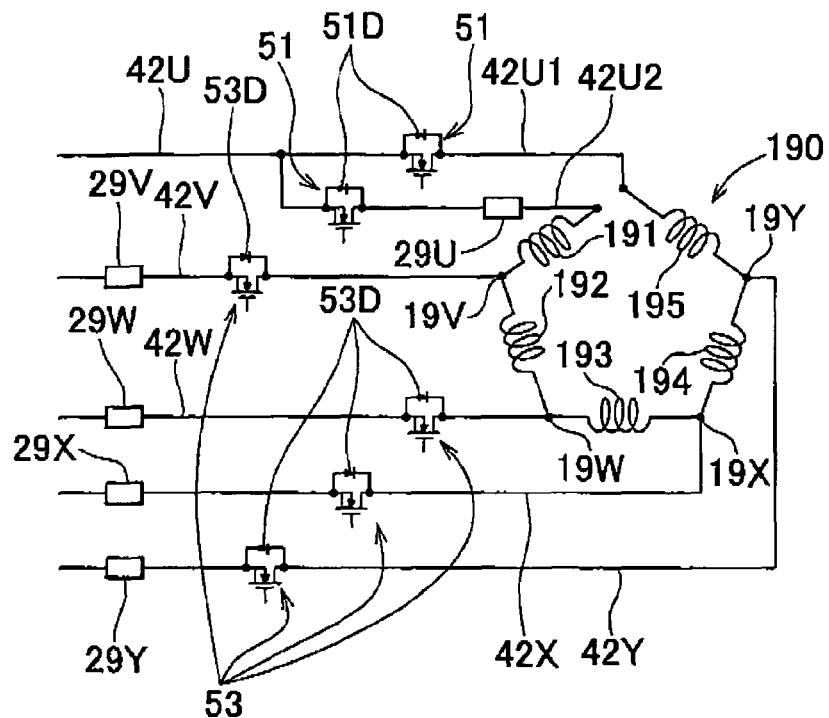
FIG. 7A is a circuit diagram showing a manner in which feed lines are connected to phase coils of a motor according to a modification of the embodiment.

6) In the first and second embodiments, the number of the phase coils of the motor 19 is three. Alternatively, the number of the phase coils of the motor 19 may be two, or four or more. For example, as shown in FIG. 7, if five phase coils 191 to 195, connected to each other in series, are arranged between the paired branch feed lines 42U1 and 42U2 that branch off from the U-phase feed line 42U that serves as the first phase feed line, the phase coils 191 to 195 of the motor 19 are connected to each other in the ring-connection manner. When the phase-open MOSFETs 51 and 53 are provided in the motor 19, the phase-open MOSFETs 51 may be provided in middle portions of the paired branch feed lines 42U1 and 42U2 and the phase-open MOSFETs 52 may be provided in middle portions of the V-phase feed line 42V, the W-phase feed line 42W, the X-phase feed line 42X and the Y-phase feed line 42Y that serve as the second phase to fifth phase feed lines, respectively, as shown in FIG. 7A.

Figure 7B:
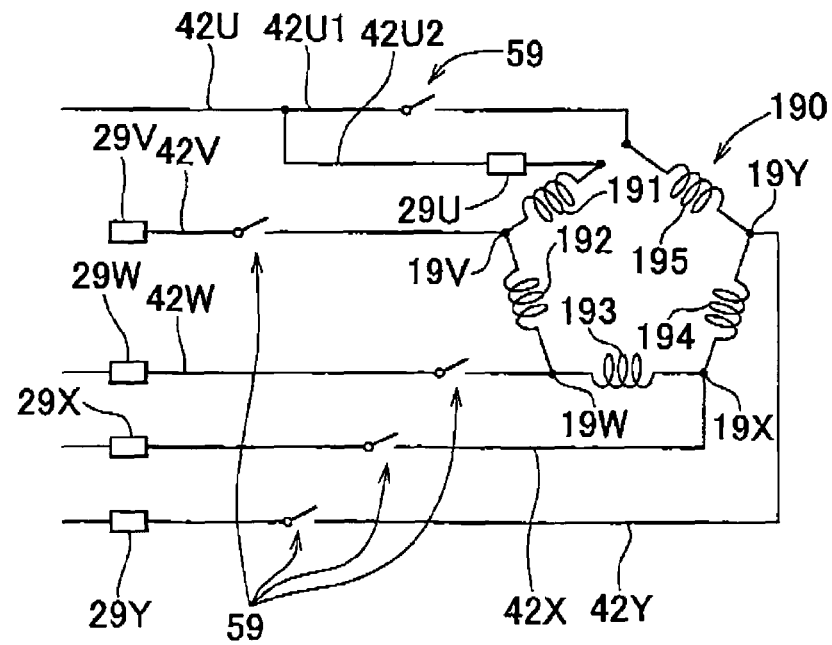
FIG. 7B is a circuit diagram showing a manner in which the feed lines are connected to the phase coils of the motor according to a modification of the embodiment.

When the mechanical switches 59 are provided, as shown in FIG. 7B, the mechanical switches 59 may be provided in a middle portion of one of the branch feed lines 42U1 and 42U2 (for example, the first branch feed line 42U1) and middle portions of the V-phase feed line 42V, the W-phase feed line 42W, the X-phase feed line 42X and the Y-phase feed line 42Y.

Regardless of the type of the phase-open elements, the current sensor 29U may be provided in a middle portion of one of the paired branch feed lines 42U1 and 42U2 (for example, the second branch feed line 42U2), and the current sensors 29V, 29W, 29X and 29Y may be provided in middle portions of the V-phase feed line 42V, the W-phase feed line 42W, the X-phase feed line 42X and the Y-phase feed line 42Y, respectively.

7) In the embodiments described above, the phase-open MOSFETs 51 provided in the branch feed lines 42U1 and 42U2 or the mechanical switch 59 provided in one of the branch feed lines 42U1 and 42U2 are/is arranged in the steering control unit 40. Alternatively, the motor 19 may be a so-called electro-mechanical integrated motor in which the motor drive circuit 43 is housed in a motor housing (not shown), and the phase-open MOSFETs 51 or the mechanical switch 59 may be arranged in the electro-mechanical integrated motor.

8) In the second embodiment, if an abnormality occurs, the mechanical switches 59 may be turned off in a predetermined order based on the power feeding emergency stop program PG1. Thus, it is possible to prevent arc discharge when the mechanical switches 59 are turned off. As a result, it is possible to prevent deterioration of the connection points.

What is claimed is:

1. A motor circuit, comprising:
an alternating-current motor that includes first phase to $n_{th}$ phase coils;
a motor drive control circuit that includes first phase to $n_{th}$ phase alternating-current feed lines through which an n-phase alternating-current is supplied to the alternating-current motor; and
phase-open units that disconnect the motor drive control circuit and the alternating-current motor from each other in an abnormal condition where the n-phase alternating-current is not able to be output, wherein
the first phase alternating-current feed line branches into paired branch feed lines;
the first phase to $n_{th}$ phase coils are connected to each other in a ring-connection manner by arranging the first phase to $n_{th}$ phase coils, connected to each other in series, between the paired branch feed lines, and connecting the second phase to $n_{th}$ phase alternating-current feed lines to portions at which the phase coils are connected to each other in a serial connection circuit that includes the first phase to $n_{th}$ phase coils;
the phase-open units are provided in the second phase to $n_{th}$ phase alternating-current feed lines and at least one of the branch feed lines; and
when an electric current flows through the phase-open units when the abnormal condition occurs, the motor drive control circuit is configured to turn off each phase-open unit, where the electric current flows, after the electric current that flows through each phase-open unit becomes equal to or lower than a predetermined reference value determined by the motor drive control circuit.

2. The motor circuit according to claim 1, wherein:
the phase-open units are MOSFETs;
the MOSFETs are provided in the branch feed lines and the second phase to $n_{th}$ phase alternating-current feed lines; and
parasitic diodes of all the phase-open MOSFETs are in the same orientation with respect to the alternating-current motor.

3. The motor circuit according to claim 2, wherein:
the $n_{th}$ phase coil is a third phase coil;
the phase-open MOSFETs are arranged in the motor drive control circuit; and
the ring-connection among the first phase to third phase coils is a delta-connection.

4. The motor circuit according to claim 2, wherein:
current sensors are provided in the alternating-current feed lines other than the first phase alternating-current feed line and one of the branch feed lines; and
the motor drive control circuit determines whether each of the electric currents that flow between the sources and the drains of the phase-open MOSFETs is equal to or lower than the predetermined reference value based on detection results obtained by the current sensors.

5. An electric power steering apparatus, comprising:
the motor circuit according to claim 2.

6. The motor circuit according to claim 1, wherein:
the phase-open units are mechanical switches;
the mechanical switches are provided in the second phase to $n_{th}$ phase alternating-current feed lines and one of the branch feed lines.

7. The motor circuit according to claim 6, wherein:
the $_{th}$ phase coil is a third phase coil:
the mechanical switches are arranged in the motor drive control circuit; and
the ring-connection among the first phase to third phase coils is a delta-connection.

8. An electric power steering apparatus, comprising:
the motor circuit according to claim 6.

* * * * *